United States Patent
Allard et al.

(10) Patent No.: US 12,358,511 B2
(45) Date of Patent: Jul. 15, 2025

(54) VEHICLE ENGINE TORQUE REDUCTION SYSTEM

(71) Applicant: FCA US LLC, Auburn Hills, MI (US)

(72) Inventors: Corey A Allard, Fenton, MI (US);
Javed A Dada, Lapeer, MI (US); Oscar Munoz, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/362,174

(22) Filed: Jul. 31, 2023

(65) Prior Publication Data
US 2025/0042408 A1    Feb. 6, 2025

(51) Int. Cl.
*B60W 30/19*   (2012.01)
*B60W 10/04*   (2006.01)
*B60W 10/06*   (2006.01)
*B60W 50/08*   (2020.01)
*B60W 50/10*   (2012.01)
*B60W 50/14*   (2020.01)
*B60W 10/08*   (2006.01)

(52) U.S. Cl.
CPC ............ *B60W 30/19* (2013.01); *B60W 50/10* (2013.01); *B60W 10/04* (2013.01); *B60W 10/06* (2013.01); *B60W 10/08* (2013.01); *B60W 2510/0657* (2013.01); *B60W 2510/08* (2013.01); *B60W 2510/081* (2013.01); *B60W 2510/083* (2013.01)

(58) Field of Classification Search
CPC ............. B60W 30/19; B60W 50/10; B60W 2510/0657; B60K 1/00–2704/00; F16D 1/00–2500/7109; F16H 61/16–2061/185
See application file for complete search history.

(56) References Cited

U.S. PATENT DOCUMENTS

| | | | |
|---|---|---|---|
| 5,993,350 A * | 11/1999 | Lawrie ................. | B60W 10/10 903/945 |
| 6,019,698 A * | 2/2000 | Lawrie ................. | B60W 10/06 477/3 |
| 2015/0099607 A1* | 4/2015 | Yamazaki ............. | B60W 10/08 180/65.265 |
| 2019/0039599 A1* | 2/2019 | Hawley ................. | B60W 20/40 |
| 2020/0180627 A1* | 6/2020 | Hoare ............. | B60W 30/18172 |

FOREIGN PATENT DOCUMENTS

EP    0931686 A1 *   7/1999    ............ B60W 10/06

* cited by examiner

Primary Examiner — Tinh Dang
(74) Attorney, Agent, or Firm — Jeremy J. Klobucar

(57) ABSTRACT

A launch control system for a vehicle having a torque generating system to generate and transfer drive torque to a transmission includes a driver interface configured to display information to and receive input from a driver of the vehicle. A controller is in signal communication with the driver interface, the torque generating system, and the transmission. The controller is configured to (i) display, via the driver interface, a torque reduction request for a gear shift of the transmission, (ii) receive, from the driver via the driver interface, a driver selected torque reduction request for the gear shift, and (iii) perform the driver selected torque reduction request at the torque generating system during the gear shift.

18 Claims, 2 Drawing Sheets

VEHICLE ENGINE TORQUE REDUCTION SYSTEM

FIELD

The present application generally relates to vehicle launch control and, more particularly, to vehicle launch control with engine torque reduction.

BACKGROUND

Some of today's higher performance vehicles have powertrains that are so powerful that launch control techniques are preferred to prevent wheel slip and to optimize vehicle performance, particularly for drag racing scenarios. Traditionally, a driver must manually modulate the pedal of the vehicle to maintain traction at launch, which potentially has a significant impact on performance as well as runt-to-run repeatability. Moreover, engine torque during transmission gear shifts is fixed. Thus, the driver cannot manually control the amount of engine torque during gear shifts, which can potentially result in wheel slip for various track conditions. Accordingly, while such conventional vehicle launch control techniques work for their intended purpose, there exists an opportunity for improvement in the relevant art.

SUMMARY

In accordance with an example aspect of the invention, a launch control system for a vehicle having a torque generating system to generate and transfer drive torque to a transmission is provided. In one example implementation, the launch control system includes a driver interface configured to display information to and receive input from a driver of the vehicle and a controller in signal communication with the driver interface, the torque generating system, and the transmission. The controller is configured to (i) display, via the driver interface, a torque reduction request for a gear shift of the transmission, (ii) receive, from the driver via the driver interface, a driver selected torque reduction request for the gear shift, and (iii) perform the driver selected torque reduction request at the torque generating system during the gear shift.

In addition to the foregoing, the described launch control system may include one or more of the following features: wherein the torque reduction request includes a range of torque reduction from zero to a predetermined maximum amount; wherein the controller is further configured to send a signal to the torque generating system indicating the driver selected torque reduction request; wherein the controller is further configured to receive, from the transmission, a shift torque request at the gear shift; wherein the controller is further configured to replace the transmission shift torque request with the driver selected torque reduction request; wherein the gear shift is a shift from a first gear to a second gear of the transmission; wherein the gear shift is a shift from a second gear to a third gear of the transmission; and wherein the torque generating system is an internal combustion engine.

In accordance with another example aspect of the invention, a launch control method for a vehicle having a torque generating system to generate and transfer drive torque to a transmission is provided. In one example implementation, the method includes providing a driver interface configured to display information to and receive input from a driver of the vehicle, providing a controller in signal communication with the driver interface, the torque generating system, and the transmission, and displaying, by the controller and via the driver interface, a torque reduction request for a gear shift of the transmission. The method further includes receiving, by the controller and from the driver via the driver interface, a driver selected torque reduction request for the gear shift, and performing, by the controller, the driver selected torque reduction request at the torque generating system during the gear shift.

In addition to the foregoing, the described method may include one or more of the following features: wherein displaying the torque reduction request includes displaying a range of torque reduction from zero to a predetermined maximum amount; sending, by the controller, a signal to the torque generating system indicating the driver selected torque reduction request; receiving, by the controller and from the transmission, a shift torque request at the gear shift; replacing, by the controller, the transmission shift torque request with the driver selected torque reduction request; wherein the gear shift is a shift from a first gear to a second gear of the transmission; wherein the gear shift is a shift from a second gear to a third gear of the transmission; and wherein the torque generating system is an internal combustion engine.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, wheel slip may occur when performing drag runs on a track, leading to poor performance. Traditionally, wheel spin is limited by vehicle traction control, but often in a drag mode the traction control is no longer active. To prevent wheel slip, a driver may manually modulate the pedal of the vehicle to maintain traction. However, when the driver is manually limiting engine torque there is a significant impact on performance as well as runt-to-run repeatability. As a result, the present application is directed to a system for clutch control shift torque management to affect the vehicle upshift. The system includes logic control to enable the driver to select the amount of shift energy torque management (torque reduction) a given shift will receive, to thereby assist the vehicle in maintaining traction during high load situations.

In one example, the driver selects a torque reduction for one or more upshifts, and the transmission sends a flag to the engine at the appropriate time in the shift indicating that a torque request would be possible. At that time, the engine responds by supplying the torque request indicated by the driver in place of what torque reduction was present before. As such the system enables the driver to select an engine torque reduction during upshifts based on the current track condition and preparation. The ability to add a torque request to a shift that does not already possess a request reduces the amount of torque to the wheels and thus reduces the opportunity for wheel spin. The chosen torque reduction level(s) are performed automatically and are repeatable, thereby reducing run-to-run variation.

Figure 1:
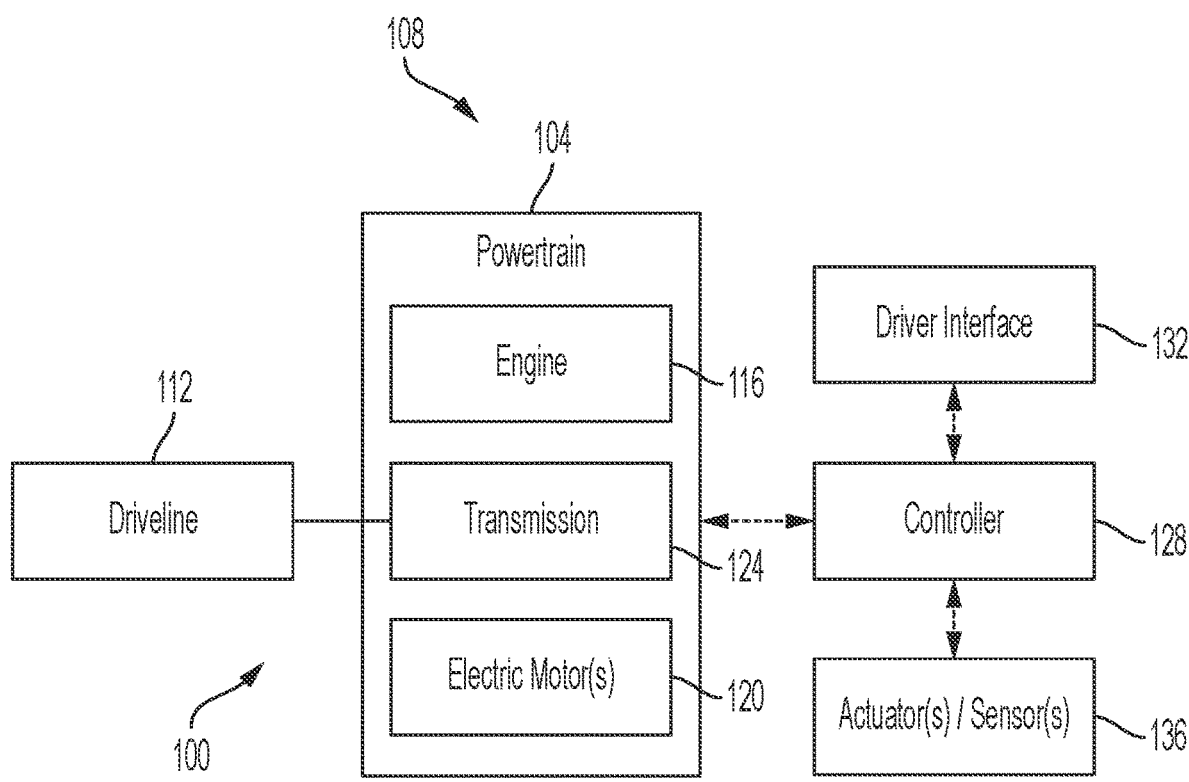
FIG. 1 is a functional block diagram of a vehicle having an example launch control system according to the principles of the present application.

Referring now to FIG. 1, a functional block diagram of a vehicle 100 having a powertrain 104 and a launch control system 108 according to some implementations of the present disclosure is illustrated. The powertrain 104 comprises a torque generating system configured to generate drive torque that is transferred to a driveline 112 of the vehicle 100. The torque generating system includes an internal combustion engine 116, one or more electric motors 120, or some combination thereof (e.g., a hybrid configuration). The drive torque is transferred to the driveline 112 via a transmission 124, such as an automatic transmission having a transmission control module (not shown).

The transmission 124 is also configured to provide a "trans brake" feature, such that the transmission 124 locks up its output shaft and prevents the delivery of drive torque being input to the transmission 124. A controller 128 controls operation of the powertrain 104, for example, such that the powertrain 104 generates an amount of drive torque to satisfy a driver torque request provided via a driver interface 132 (e.g., an accelerator pedal). In one example, controller 128 is an engine control module (ECM).

The controller 128 also receives information from and/or controls other sensors/actuator(s) 136 of the vehicle 100. The driver interface 132 could further include other components, such as an infotainment unit comprising a touch display for displaying information to and receiving input from the driver. In one exemplary implementation, the controller 128 and the driver interface 132 are in communication to (i) determine and display a torque reduction (negative) amount available for a given shift (torque reduction request), (ii) receive, from the driver, a driver selected torque reduction amount for the given shift (the desired torque reduction), and (iii) generate a driver selected torque reduction request to be sent to the transmission 124 and/or the engine 116.

Figure 2:
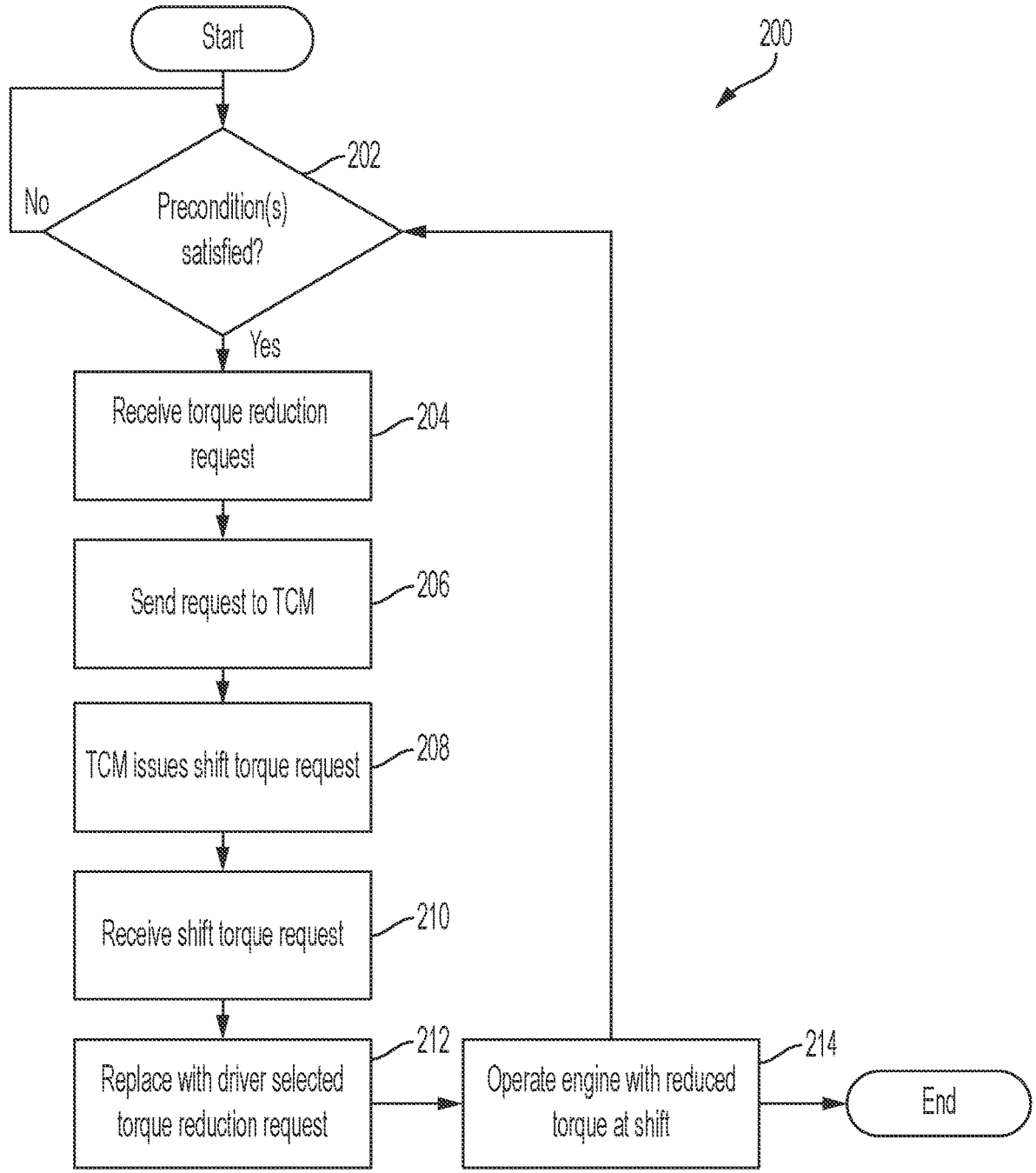
FIG. 2 is a flow diagram of an example vehicle torque reduction control method according to the principles of the present application.

Referring now to FIG. 2, a flowchart of a vehicle torque reduction control method 200 according to one example of the present application is illustrated. At step 202, the controller 128 determines whether one or more precondition(s) are satisfied. This could include, for example only, the powertrain 104 being activated (e.g., the engine 116 running) and the transmission 124 being in park. This could be, for example, while the driver and the vehicle 100 are in a pit station at a drag race facility.

When the precondition(s) are satisfied, the method 200 proceeds to 204. Otherwise, the method 200 ends or returns to step 202. At step 204, controller 128 receives, from the driver via the driver interface 132, a driver selected torque reduction request for a given shift, such as first gear to second gear and/or second gear to third gear. For example, the driver interface 132 may display an available torque reduction range for first to second gear and for second gear to third gear (torque reduction request). The driver may adjust the torque reduction for each gear shift based past vehicle performance, track conditions, ambient conditions, etc. The torque reduction amount may range from zero reduction to a predetermined maximum amount set by the engine 116 to maintain shift quality.

At step 206, controller 128 sends a signal to the transmission 124 indicating the driver selected torque reduction request. In one example, controller 128 sends a flag (e.g., "Cruise Control Engaged") to the transmission 124, which allows for a shift schedule and shift feel change in the transmission 124. The shift schedule is optimized for the use of torque reduction, and the change in shift feel enables smooth and refined shifts utilizing various torque reduction amounts. At step 208, transmission 124 (e.g., transmission controller) issues a shift torque request at a predetermined time during a gear shift (e.g., first gear to second gear).

At step 210, controller 128 receives the transmission shift torque request from the transmission 124. At step 212, controller 128 replaces the transmission torque request with the driver selected torque reduction request. In one example, the controller 128 compares the originally issued transmission request and determines a factor by which to multiply the transmission torque request in order to meet the absolute torque requested by the driver via the driver interface 132. At step 214, controller 128 operates the engine 116 to provide reduced torque per the driver selected torque reduction request during the desired shift. Control then ends or returns to step 202 to perform one or more additional cycles.

Described herein are systems and methods for clutch control shift torque management to reduce wheel slip when performing drag runs. Utilizing a driver interface, such as an infotainment touchscreen, the driver is able to select a desired engine torque reduction during upshifts to reduce torque to the wheels and therefore the opportunity for wheel spin. As such, the system enables the driver to automatically reduce wheel torque during shifts, rather than manually modulate the accelerator pedal, providing a repeatable process for novice and experienced racers alike.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A launch control system for a vehicle having a torque generating system to generate and transfer drive torque to a transmission, the launch control system comprising:
   a driver interface including a touchscreen configured to display information to and receive input from a driver of the vehicle; and a controller in signal communication with the driver interface, the torque generating system, and the transmission, and configured to:
- display, via the driver interface touchscreen, a torque reduction request for a gear shift of the transmission that enables the driver to select an amount of torque reduction from a predetermined range that the gear shift will receive;
- receive, from the driver via the driver interface touchscreen, a driver selected torque reduction amount request for the gear shift; and
- perform the driver selected torque reduction amount request at the torque generating system during the gear shift, to thereby facilitate reducing torque to vehicle wheels to reduce wheel slip during the gear shift.

2. The launch control system of claim 1, wherein the predetermined range is an available range of driver selectable torque reduction from zero to a predetermined maximum amount.

3. The launch control system of claim 1, wherein the controller is further configured to send a signal to the torque generating system indicating the driver selected torque reduction request.

4. The launch control system of claim 3, wherein the controller is further configured to receive, from the transmission, a shift torque request at the gear shift.

5. The launch control system of claim 4, wherein the controller is further configured to replace the transmission shift torque request with the driver selected torque reduction request.

6. The launch control system of claim 1, wherein the gear shift is a shift from a first gear to a second gear of the transmission.

7. The launch control system of claim 1, wherein the gear shift is a shift from a second gear to a third gear of the transmission.

8. The launch control system of claim 1, wherein the torque generating system is an internal combustion engine, and wherein the transmission is an automatic transmission.

9. A launch control method for a vehicle having a torque generating system to generate and transfer drive torque to a transmission, the method comprising:
- providing a driver interface including a touchscreen configured to display information to and receive input from a driver of the vehicle;
- providing a controller in signal communication with the driver interface touchscreen, the torque generating system, and the transmission;
- displaying, by the controller and via the driver interface touchscreen, a torque reduction request for a gear shift of the transmission that enables the driver to select an amount of torque reduction from a predetermined range that the gear shift will receive;
- receiving, by the controller and from the driver via the driver interface touchscreen, a driver selected torque reduction amount request for the gear shift; and
- performing, by the controller, the driver selected torque reduction amount request at the torque generating system during the gear shift, to thereby facilitate reducing torque to vehicle wheels to reduce wheel slip during the gear shift.

10. The method of claim 9, wherein the predetermined range is an available range of driver selectable torque reduction from zero to a predetermined maximum amount.

11. The method of claim 9, further comprising sending, by the controller, a signal to the torque generating system indicating the driver selected torque reduction request.

12. The method of claim 11, further comprising receiving, by the controller and from the transmission, a shift torque request at the gear shift.

13. The method of claim 12, further comprising replacing, by the controller, the transmission shift torque request with the driver selected torque reduction request.

14. The method of claim 9, wherein the gear shift is a shift from a first gear to a second gear of the transmission.

15. The method of claim 9, wherein the gear shift is a shift from a second gear to a third gear of the transmission.

16. The method of claim 9, wherein the torque generating system is an internal combustion engine, and wherein the transmission is an automatic transmission.

17. The launch control system of claim 1, wherein the controller is further configured to display the torque reduction request on the driver interface touchscreen when one or more preconditions are satisfied.

18. The launch control system of claim 17, wherein the one or more preconditions comprise each of:
- a powertrain is activated;
- the transmission is in Park; and
- the vehicle is in a drag racing mode where a vehicle traction control is inactive.

* * * * *